US012076735B2

(12) United States Patent
Wales et al.

(10) Patent No.: US 12,076,735 B2
(45) Date of Patent: Sep. 3, 2024

(54) SHOWERHEAD INCLUDING SPRAY NOZZLE AND DEFLECTOR

(71) Applicant: Delta Faucet Company, Indianapolis, IN (US)

(72) Inventors: Joshua Drew Wales, Indianapolis, IN (US); David Lee, Westfield, IN (US)

(73) Assignee: Delta Faucet Company, Indianapolis, IN (US)

( * ) Notice: Subject to any disclaimer, the term of this patent is extended or adjusted under 35 U.S.C. 154(b) by 737 days.

(21) Appl. No.: 16/849,221

(22) Filed: Apr. 15, 2020

(65) Prior Publication Data

US 2020/0346229 A1 Nov. 5, 2020

Related U.S. Application Data

(60) Provisional application No. 62/840,832, filed on Apr. 30, 2019.

(51) Int. Cl.

*B05B 1/04* (2006.01)
*B05B 1/16* (2006.01)
*B05B 1/18* (2006.01)
*B05B 1/34* (2006.01)

(52) U.S. Cl.

CPC ............ *B05B 1/3402* (2018.08); *B05B 1/044* (2013.01); *B05B 1/16* (2013.01); *B05B 1/185* (2013.01)

(58) Field of Classification Search

CPC ......... B05B 1/044; B05B 1/3402; B05B 1/16; B05B 1/18; B05B 1/185; B05B 1/267; B05B 17/085; B05B 1/26; B05B 1/262; B05B 15/658; B05B 1/34; B05B 1/3436; B05B 1/3431; E03C 1/08; E03C 2001/0414; E03C 1/0404; E03C 1/0405; E03C 1/0408; E03C 1/0407; A47K 3/28

USPC .................................................. 239/436–449

See application file for complete search history.

(56) References Cited

U.S. PATENT DOCUMENTS 1,644,072 A * 10/1927 Miller ..................... B05B 1/267 239/511
3,847,159 A 11/1974 Hofer
4,072,397 A * 2/1978 Ross ...................... A45D 42/00 4/597
5,253,811 A 10/1993 Sieth
5,604,633 A 2/1997 Christianson
6,053,464 A 4/2000 Cardarelli
6,557,785 B1 * 5/2003 Knapp .................... B05B 1/265 239/311
10,132,423 B1 * 11/2018 Lan ......................... B05B 1/185
2005/0205697 A1 * 9/2005 Lo ............................ B05B 1/16 239/394
2006/0207010 A1 9/2006 DeBoer et al.

(Continued)

FOREIGN PATENT DOCUMENTS

CN 201115834 Y 9/2008
CN 102161023 A 8/2011

(Continued)

*Primary Examiner* — Tuongminh N Pham
*Assistant Examiner* — Juan C Barrera
(74) *Attorney, Agent, or Firm* — Bose McKinney & Evans LLP

(57) ABSTRACT

A showerhead includes a water outlet and a deflector in axial spaced relation to the water outlet. Water discharged from the water outlet is configured to extend axially through a vertical opening and impact the deflector to form a sheet-like water layer.

17 Claims, 6 Drawing Sheets

(56) References Cited

U.S. PATENT DOCUMENTS

| | | | |
|---|---|---|---|
| 2013/0219613 | A1 | 8/2013 | Ojea |
| 2017/0189919 | A1 | 7/2017 | Mei |

FOREIGN PATENT DOCUMENTS

| | | | |
|---|---|---|---|
| CN | 201930857 | U | 8/2011 |
| CN | 202803469 | U | 3/2013 |
| JP | 2013192757 | A | 9/2013 |

* cited by examiner

SHOWERHEAD INCLUDING SPRAY NOZZLE AND DEFLECTOR

CROSS-REFERENCE TO RELATED APPLICATION

The present application claims priority to U.S. Provisional Patent Application Ser. No. 62/840,832, filed Apr. 30, 2019, the disclosure of which is expressly incorporated herein by reference.

BACKGROUND AND SUMMARY OF THE DISCLOSURE

The present disclosure relates generally to showerheads, and more particularly, to a showerhead including an outlet nozzle and a cooperating deflector.

The present disclosure provides a showerhead generating a flat waterfall like spray by discharging a water stream from an outlet nozzle such that it impinges on a deflector having a water contact surface facing the outlet. Illustratively, the outlet nozzle is spaced apart from the deflector by a vertically extending void or opening. The showerhead is configured to generate a waterfall spray while eliminating the challenge of manufacturing features for conveying water within extended channels of the showerhead without compromising industrial design.

Illustratively, a solid water stream (e.g., laminar) is formed and discharged by a water outlet nozzle from a first side of the showerhead to an opposing side of the showerhead, where a deflector spreads it into a downward waterfall like sheet flow.

According to an illustrative embodiment of the present disclosure, a showerhead includes a base, a water inlet supported by the base, a water outlet supported by the base and in fluid communication with the water inlet, and a deflector in axial spaced relation to the water outlet. A first support arm is coupled to the base and the deflector, and a second support arm is coupled to the base and the deflector, wherein the second support arm is in laterally spaced relation to the first support arm. A vertically extending opening is defined axially between the base and the deflector, and laterally between the first support arm and the second support arm.

According to an illustrative embodiment, the deflector includes a water contact surface facing the water outlet, wherein the water contact surface is concave in a vertical direction. In an illustrative embodiment, the water contact surface is concave in a lateral direction. Further illustratively, the deflector includes an upper shield extending axially in a rearward direction toward the water outlet. In an illustrative embodiment, a housing defines a water chamber supported by the base, and a faceplate is coupled to the housing and includes a plurality of water outlet openings. A diverter valve may be configured to select water flow between the water outlet and the water outlet openings. Illustratively, water discharged from the water outlet is configured to extend axially through the vertically extending opening and impact the deflector to form a sheet-like layer of water. Further illustratively, the water outlet includes a conical shaped discharge nozzle and a stream straightener in fluid communication with the discharge nozzle. Illustratively, the water inlet includes a coupler to fluidly couple with a shower arm.

According to another illustrative embodiment of the present disclosure, a showerhead includes a base, a water inlet supported by the base, a water outlet supported by the base and in fluid communication with the water inlet, and a deflector in spaced relation to the water outlet. The deflector includes a water contact surface facing the water outlet. The water contact surface is concave in a vertical direction.

According to an illustrative embodiment, the water contact surface of the deflector is concave in a lateral direction. Illustratively, the showerhead further includes a first support arm coupled to the base and the deflector, a second support arm coupled to the base and the deflector, the second support arm being in laterally spaced relation to the first support arm, and a vertically extending opening defined axially between the base and the deflector, and laterally between the first support arm and the second support arm. Further illustratively, the deflector includes an upper shield extending axially in a rearward direction toward the water outlet. Illustratively, a housing defines a water chamber supported by the base, and a faceplate coupled to the housing and including a plurality of water outlet openings. A diverter valve may be configured to select water between the water outlet and the water outlet openings. Further illustratively, water discharged from the water outlet is configured to extend axially through the opening and impact the deflector to form a sheet-like layer of water. In an illustrative embodiment, the water outlet includes a conical shaped discharge nozzle and a stream straightener in fluid communication with the discharge nozzle. Further illustratively, the water inlet includes a coupler to fluidly couple with a shower arm.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
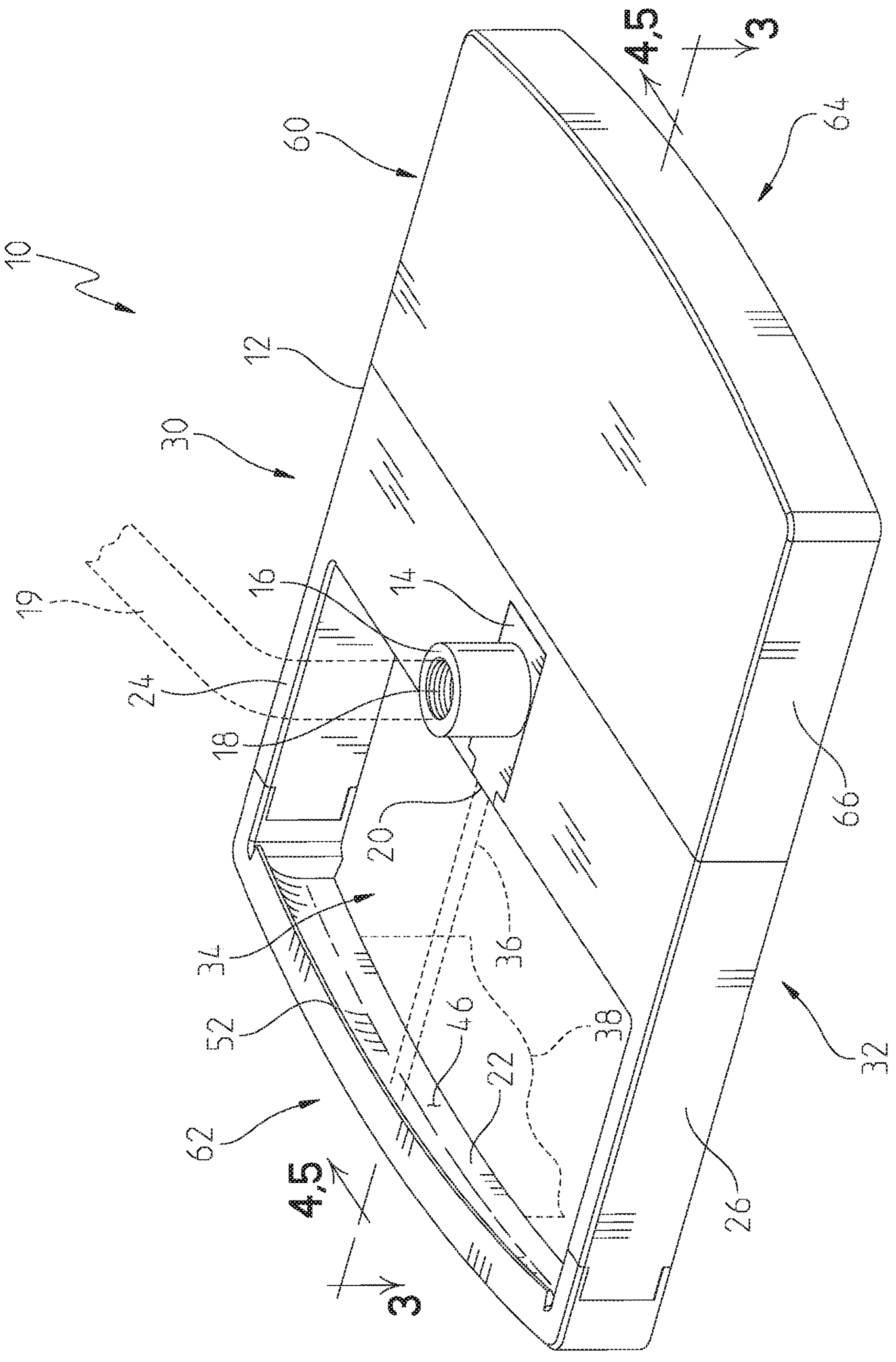
FIG. 1 is a top perspective view of the illustrative showerhead.

For the purposes of promoting and understanding the principles of the present disclosure, reference will now be made to the embodiments illustrated in the drawings, which are described herein.

Figure 2:
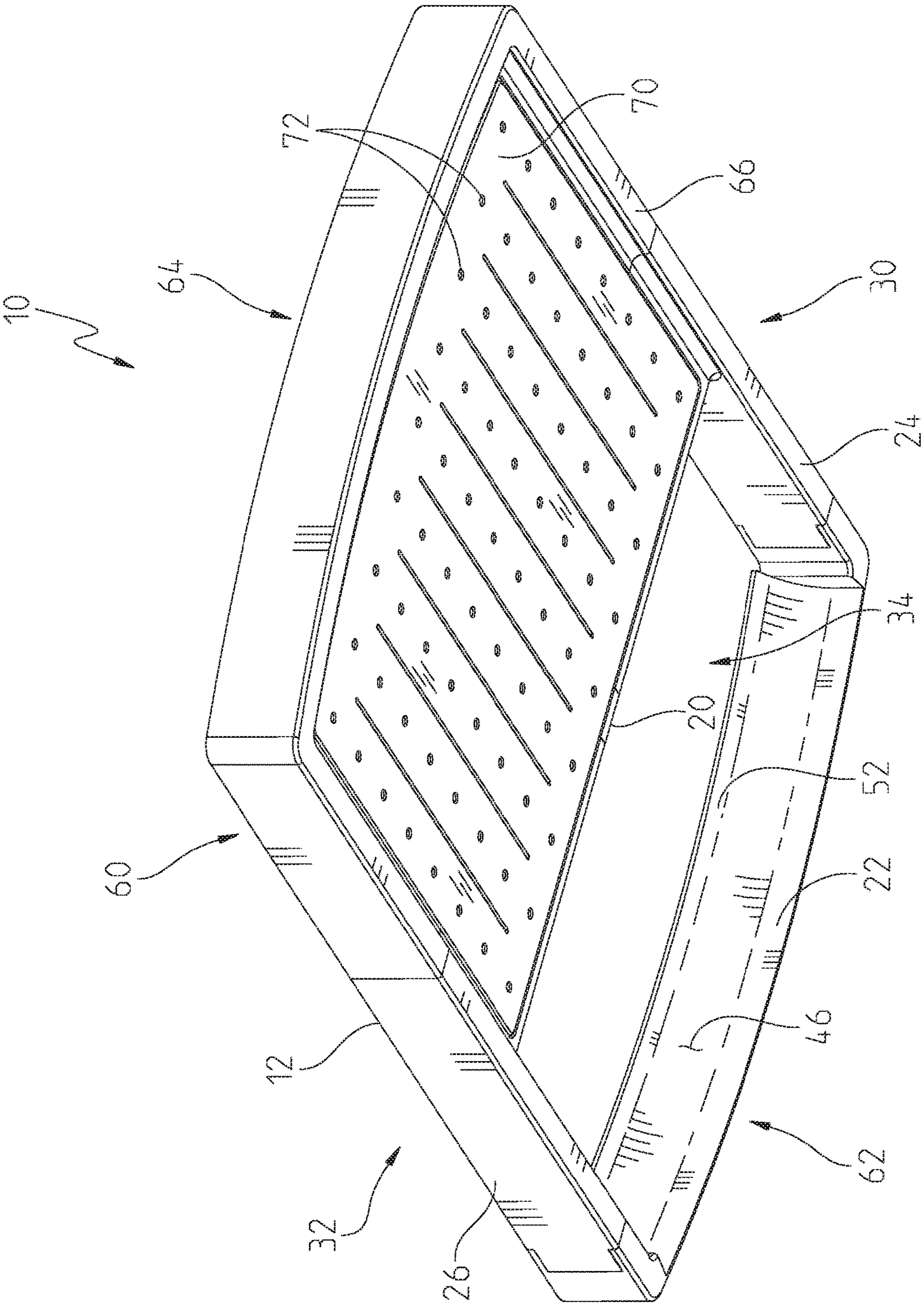
FIG. 2 is a bottom perspective view of an illustrative showerhead of FIG. 1.

With reference initially to FIGS. 1 and 2, a showerhead 10 according to an illustrative embodiment of the present disclosure includes a body 12 including a base 14. A water inlet 16 is supported by the base 14 and illustratively includes a fluid coupler 18, such as internal threads to fluidly couple to a conventional shower arm 19. Illustratively, a horizontally oriented water outlet 20 is supported by the base 14 and is in fluid communication with the water inlet 16. A deflector 22 is illustratively positioned in axial spaced relation to the water outlet 20 and is coupled to the base 14 via first and second support arms 24 and 26. In other words, the deflector 22 is illustratively spaced some horizontal distance from the water outlet 20 along the axis of the water outlet 20.

The first support arm 24 is coupled to the base 14 and the deflector 22 at a first side 30, while a second support arm 26 is coupled to the base 14 and the deflector 22 at a second side 32. The second support arm 24 is laterally spaced relative to the first support arm 26. While two support arms 24 and 26 are illustrated, any number or types of supports may be used to position the deflector 22 relative to the water outlet 20. A vertically extending void or opening 34 is defined axially between the base 14 and the deflector 22, and laterally between the first support arm 24 and the second support arm 26. It should be appreciated that in certain illustrative embodiments, a cover (not shown) may be supported above the support arms 24 and 26 such that the opening 34 is not visible from above.

Figure 3:
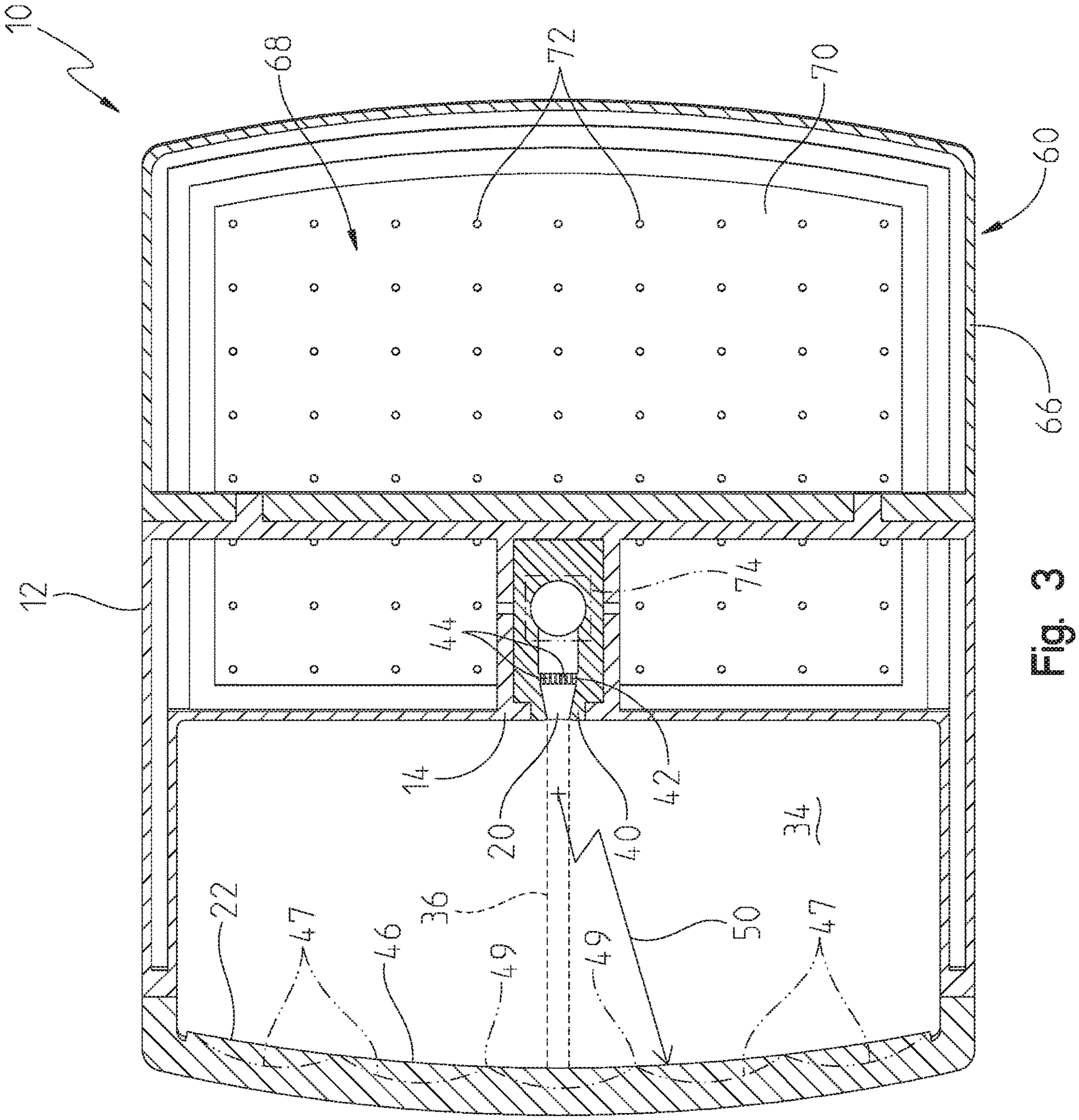
FIG. 3 is a cross-sectional view taken along line 3-3 of FIG. 1.
Figure 4:
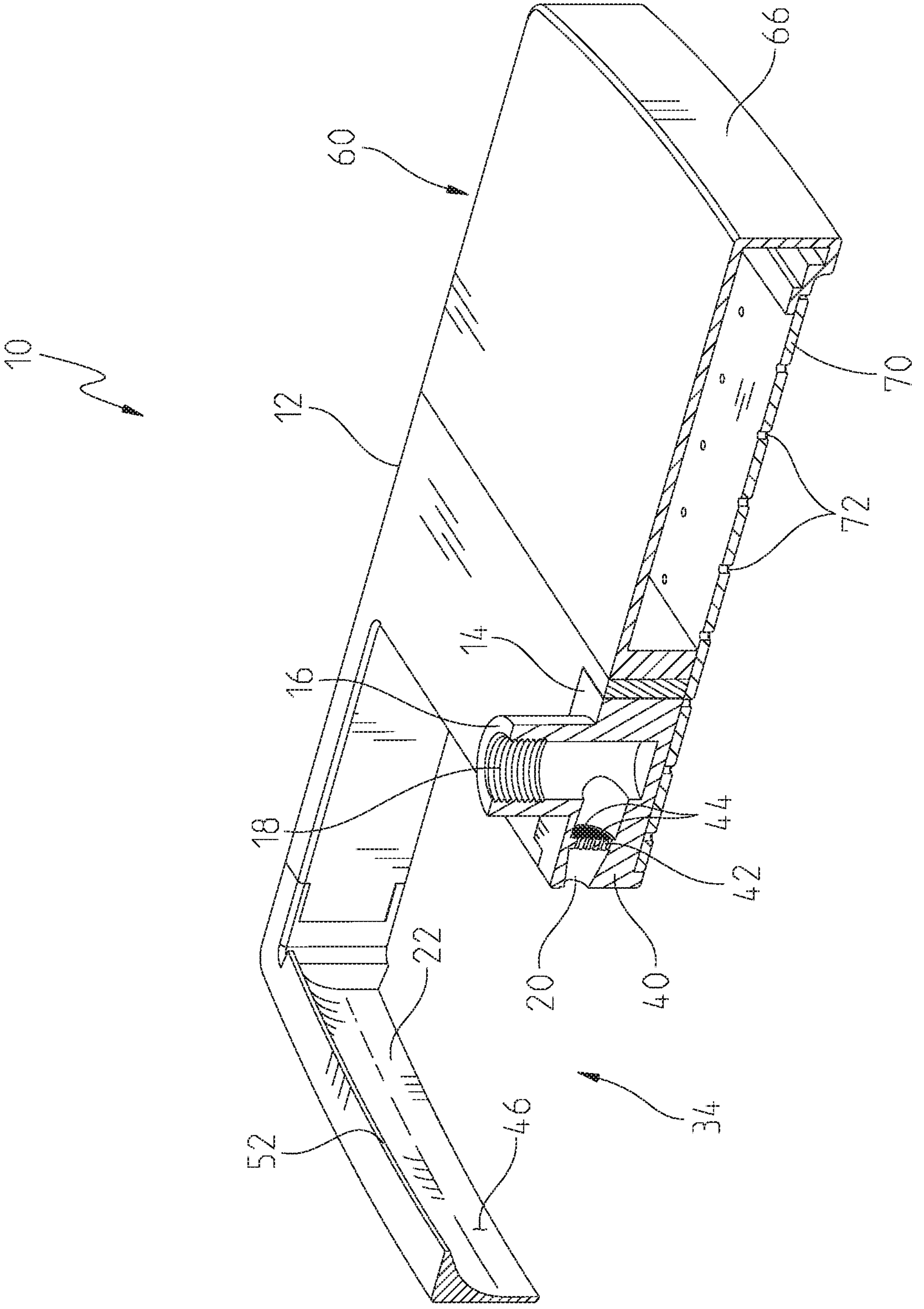
FIG. 4 is a cross-sectional view taken along line 4-4 of FIG. 1.
Figure 5:
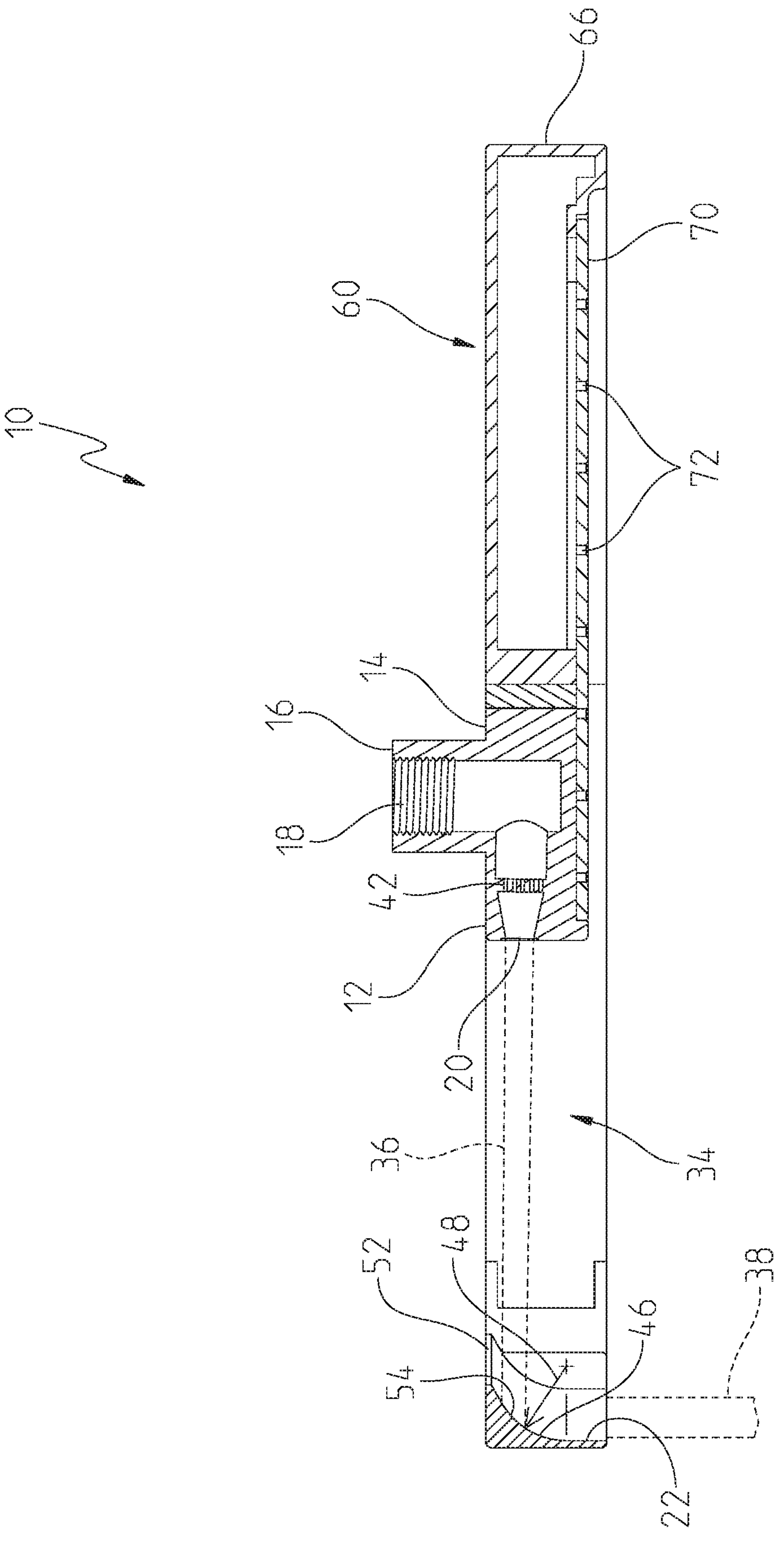
FIG. 5 is a cross-sectional view taken along line 5-5 of FIG. 1.

Water discharged from the water outlet 20 is illustratively configured to extend axially through the opening 34 in a horizontal direction as a solid stream 36 impacting the deflector 22 to form a downwardly extending sheet-like water layer or waterfall 38 (FIG. 1). Illustratively, a single water outlet 20 discharges the solid stream 36 which is substantially laminar by removing turbulence therefrom. While a single water outlet 20 is illustrated, it should be appreciated that multiple water outlets 20 could discharge a plurality of spaced apart solid water streams impacting the deflector 22. As further detailed herein, sheet-like is used to define the relatively thin, uniform, smooth layer of water 38 deflected outwardly and downwardly by the deflector 22. With reference to FIGS. 3-5, the water outlet 20 illustratively includes a conical shaped passage or discharge nozzle 40. A stream straightener 42 is positioned upstream from, and in fluid communication with, the discharge nozzle 40. Illustratively, the stream straightener 42 includes a plurality of parallel axially extending passageways 44 configured to straighten, and thereby remove turbulence from water passing therethrough, while the discharge nozzle 40 converges individual water streams and increases velocity (i.e., define laminar stream 36).

With reference to FIGS. 1 and 5, the deflector 22 illustratively includes a water contact surface 46 facing inwardly toward the opening 34 and the water outlet 20. The water contact surface 46 is illustratively arcuate in a vertical direction (for example, radius of curvature 48 in FIG. 5). More particularly, the water contact surface 46 is illustratively concave in a vertical direction to facilitate directing the water downwardly into the sheet-like water layer 38. In certain illustrative embodiments, a plurality of discrete flat surfaces and/or radii may be used in the vertical direction to form the water contact surface 46, and to provide the same effect of turning or redirecting water without breaking it up, or splattering, but still smoothly generating the sheet-like water layer 38.

Further, the water contact surface 46 of the deflector 22 is illustratively arcuate in a lateral or horizontal direction (for example, radius of curvature 50 in FIG. 3). More particularly, the water contact surface 46 is illustratively concave in a lateral direction to help define the width of the sheet-like water layer 38. In certain illustrative embodiments, a plurality of discrete flat surfaces and/or radii may be used in the lateral direction to form the water contact surface 46, and to provide the same effect of turning or redirecting water without breaking it up, or splattering, but still smoothly generating the sheet-like water layer 38. In certain illustrative embodiments, the water contact surface 46 may include a plurality of concave portions 47, illustratively spaced apart by convex portions 49 (FIG. 3). With further reference to FIGS. 2 and 4, the deflector 22 further illustratively includes an upper shield 52 extending axially in a rearward direction toward the water outlet 20. The upper shield 52 helps prevent splashing of water upwardly and directs water downwardly to help define the sheet-like water layer 38.

It should be appreciated that formation of the sheet-like water layer 38 depends upon characteristics of the water stream 36 discharged from the water outlet 20, such as water turbulence, water velocity, water flow rate, etc. The angle of incidence and resulting impact point 54 of water on the water contact surface 46 of the deflector 22, and distance between the water outlet 20 and the impact point 54 of water may also alter the characteristics of the sheet-like water layer 38. The angle of incidence also impacts whether the water goes over the top or is correctly directed down from the deflector 22, as well as how quickly the water is directed down vs. spreading out laterally, which relates to the length to width ratio of the resulting water layer 38. In an illustrative embodiment, the water stream 36 at the impact point 54 is substantially perpendicular to the water contact surface 46.

The shape of the deflector 22 also controls the characteristics of the sheet-like water layer 38. For example, the vertical curvature is configured to control the direction and thickness of the sheet-like water layer 38. It should be appreciated that the water may impact anywhere on the water contact surface 46 of the deflector 22. For example, the water may impact on a planar sloped surface and then travel across a curved surface as a sheet. Further illustratively, the lateral curvature is configured to help define the lateral width of the sheet-like water layer 38. Additionally, the material composition of the deflector 22 and the texture of the water contact surface 46 may alter the characteristics of the sheet-like water layer 38.

With further reference to FIGS. 1-3, the showerhead 10 illustratively includes a raincan device 60. Illustratively, the deflector 22 is coupled to a first end 62 of the showerhead 10, while the raincan device 60 is coupled to a second end 64 of the showerhead 10. Illustratively, the raincan device 60 includes a housing 66 defining a water chamber 68 supported by the base 14. A faceplate 70 is coupled to the housing 66 and includes a plurality of downwardly facing water outlet openings 72 in fluid communication with the water chamber 68. A diverter valve 74 (FIG. 3) may be fluidly coupled to the water outlet 20 and the chamber 68 to select water flow between the water outlet 20 (and thereby the deflector 22) and the water outlet openings 72. In an illustrative embodiment, the diverter valve 74 may be a conventional three-way diverter valve providing for selective fluid communication between the water inlet 16 and (1) the water outlet 20, (2) the water outlet openings 72 and (3) both the water outlet 20 and the water outlet openings 72. In other illustrative embodiments without the diverter valve 74, water may simultaneously flow from both the water outlet 20 and the water outlet openings 72.

Figure 6:
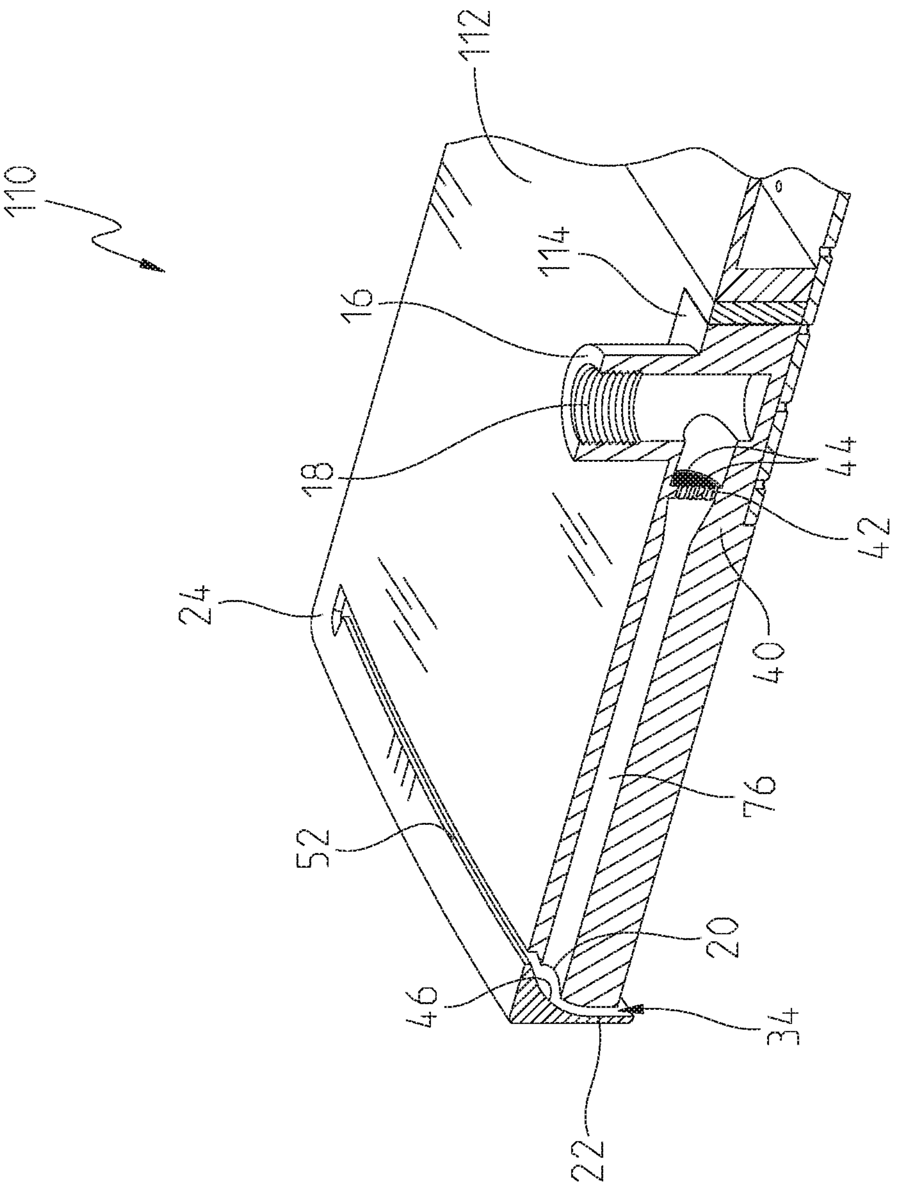
FIG. 6 is a cross-sectional view similar to FIG. 4 of a further illustrative showerhead.

A further illustrative embodiment showerhead 110 is shown in FIG. 6 as including a body 112 having a base 114. Many of the components of the illustrative showerhead 110 are substantially the same as those components of the illustrative showerhead 10 detailed above and, as such, are identified with like reference numbers. The water outlet 20 is supported by the base 14 and is in fluid communication with the water inlet 16. The deflector 22 is illustratively positioned in axially spaced relation to the water outlet 20 and is coupled to the base 14 via first and second support arms 24 and 26. In the illustrative embodiment showerhead 110 of FIG. 6, the water outlet 20 is positioned closer to the water contact surface 46 than that shown in the illustrative embodiment 10 of FIG. 4.

During operation of the illustrative showerhead 10, the grid of small passageways 44 of the stream straightener 42 laminarize the water flow and then converging nozzle 40 increases the velocity of the water flow to a higher linear velocity than available conventional laminar aerators. This water flow is then sprayed as a single laminar stream 36 from one side (in this case near the center of a 12" raincan) to the other side of the showerhead 10 where the deflector 22 is curved in the plane of the showerhead 10, as well as a vertical slope followed by a radius tangent to the slope (in the vertical direction). This combination of features allows for variation in flow rate (inherent to showerheads) and still allowing the water to hit the target area so as to spread out laterally and be directed downward in a sheet of water.

The illustrative showerhead 10 is configured to generate a sheet-like water layer or flat waterfall-like spray at 2.5 gallons per minute (gpm) with the unique visual interest of water shooting across a void 34 within the showerhead 10. While the showerhead 10 is configured to provide such an effect at 2.5 gpm, it will also work at other water pressures and associated flow rates (e.g., at flow ranges generated by a 2.5 gpm flow restrictor, such as low as 2.05 gpm). The showerhead 10 may also provide such an effect at lower flow rates, such as 1.75 gpm by using a different flow restrictor and/or diameter outlet 20.

The illustrative showerhead 10 provides for a higher velocity sheet spray than a conventional waterfall, and due to the velocity of the water more options are available in controlling the shape of the sheet including a diverging sheet instead of a converging sheet (i.e., a conventional waterfall collapses into a small diameter stream as it falls).

Although the invention has been described in detail with reference to certain preferred embodiments, variations and modifications exist within the spirit and scope of the invention as described and defined in the following claims.

The invention claimed is:

1. A showerhead comprising:
- a base;
- a water inlet supported by the base;
- a water outlet supported by the base and in fluid communication with the water inlet;
- a deflector in permanently fixed spaced relation to the water outlet;
- wherein the deflector includes a water contact surface facing the water outlet;
- wherein the water contact surface is concave in a vertical direction, and the water contact surface is concave in a lateral direction while in operation;
- at least one support arm coupled to the base and the deflector;
- a vertically extending opening defined axially between the base and the deflector;
- wherein the deflector includes an upper shield extending axially in a rearward direction toward the water outlet;
- wherein water discharged from the water outlet is configured to extend axially through the opening and impact the deflector to form a sheet-like layer of water; and
- wherein the water outlet includes a conical shaped discharge nozzle and a stream straightener in fluid communication with the discharge nozzle.

2. The showerhead of claim 1, further comprising a housing defining a water chamber supported by the base, and a faceplate coupled to the housing and including a plurality of water outlet openings.

3. The showerhead of claim 2, further comprising a diverter valve configured to select water between the water outlet and the water outlet openings.

4. The showerhead of claim 1, wherein the water inlet includes a coupler to fluidly couple with a shower arm.

5. A showerhead comprising:
- a base;
- a water inlet supported by the base;
- a water outlet supported by the base and in selective fluid communication with the water inlet;
- a deflector in permanently fixed spaced relation to the water outlet;
- wherein the deflector includes a water contact surface facing the water outlet, the water contact surface is concave in a vertical direction and is concave in a lateral direction when facing the water outlet;
- a housing defining a water chamber supported by the base and in selective fluid communication with the water inlet;
- a faceplate coupled to the housing and including a plurality of downwardly extending water outlet openings in fluid communication with the water chamber;
- wherein the water outlet is oriented horizontally and the water outlet openings are oriented vertically in spaced relation to the water outlet;
- a first support arm coupled to the base and the deflector;
- a second support arm coupled to the base and the deflector, the second support arm in laterally spaced relation to the first support arm; and
- a vertically extending opening defined axially between the base and the deflector, and laterally between the first support arm and the second support arm.

6. The showerhead of claim 5, wherein the deflector includes an upper shield extending axially in a rearward direction toward the water outlet.

7. The showerhead of claim 5, wherein water discharged from the water outlet is configured to extend axially through the opening and impact the deflector to form a sheet-like layer of water.

8. The showerhead of claim 5, wherein the water outlet includes a conical shaped discharge nozzle and a stream straightener in fluid communication with the discharge nozzle.

9. The showerhead of claim 5, wherein the water inlet includes a coupler to fluidly couple with a shower arm.

10. A showerhead comprising:
- a base;
- a water inlet supported by the base;
- a water outlet supported by the base and in selective fluid communication with the water inlet;
- a deflector in permanently fixed spaced relation to the water outlet;
- wherein the deflector includes a water contact surface facing the water outlet, the water contact surface is concave in a vertical direction and is concave in a lateral direction when facing the water outlet;
- a housing defining a water chamber supported by the base and in selective fluid communication with the water inlet;
- a faceplate coupled to the housing and including a plurality of downwardly extending water outlet openings in fluid communication with the water chamber;

wherein the water outlet is oriented horizontally and the water outlet openings are oriented vertically in spaced relation to the water outlet; and a diverter valve configured to select water between the water outlet and the water outlet openings.

11. A showerhead comprising:

a base;

a water inlet supported by the base;

a water outlet supported by the base and in selective fluid communication with the water inlet;

a deflector in spaced relation to the water outlet;

wherein the deflector includes a water contact surface facing the water outlet, the water contact surface is concave in a vertical direction when facing the water outlet;

a housing defining a water chamber supported by the base and in selective fluid communication with the water inlet;

a faceplate coupled to the housing and including a plurality of downwardly extending water outlet openings in fluid communication with the water chamber;

a first support arm coupled to the base and the deflector;

a second support arm coupled to the base and the deflector, the second support arm in laterally spaced relation to the first support arm;

a vertically extending opening defined axially between the base and the deflector, and laterally between the first support arm and the second support arm; and wherein the water outlet includes a conical shaped discharge nozzle and a stream straightener in fluid communication with the discharge nozzle.

12. The showerhead of claim 11, wherein the water outlet is oriented horizontally and the water outlet openings are oriented vertically in spaced relation to the water outlet.

13. The showerhead of claim 11, wherein the water contact surface is concave in a lateral direction.

14. The showerhead of claim 11, wherein the deflector includes an upper shield extending axially in a rearward direction toward the water outlet.

15. The showerhead of claim 11, further comprising a diverter valve configured to select water between the water outlet and the water outlet openings.

16. The showerhead of claim 11, wherein water discharged from the water outlet is configured to extend axially through the opening and impact the deflector to form a sheet-like layer of water.

17. The showerhead of claim 11, wherein the water inlet includes a coupler to fluidly couple with a shower arm.

* * * * *